United States Patent [19]

Faroudja

[11] Patent Number: 4,951,149
[45] Date of Patent: Aug. 21, 1990

[54] TELEVISION SYSTEM WITH VARIABLE ASPECT PICTURE RATIO

[76] Inventor: Yves C. Faroudja, 26595 Anacapa Dr., Los Altos, Calif. 94022

[21] Appl. No.: 263,534

[22] Filed: Oct. 27, 1988

[51] Int. Cl.$^5$ .......................... H04N 5/65; H04N 7/01
[52] U.S. Cl. .................................... 358/230; 358/180; 358/140; 358/254
[58] Field of Search .............. 358/230, 237, 242, 255, 358/254, 83, 188, 93, 180, 142, 146, 147, 148

[56] References Cited

U.S. PATENT DOCUMENTS

| | | | |
|---|---|---|---|
| 2,543,136 | 2/1951 | Sweeney | 358/254 |
| 4,394,690 | 7/1983 | Kobayashi | 358/180 |
| 4,556,906 | 12/1985 | Dischert | 358/180 |
| 4,760,455 | 7/1988 | Nagashima | 358/140 |

*Primary Examiner*—Tommy P. Chin
*Attorney, Agent, or Firm*—David B. Harrison

[57] ABSTRACT

A television signal is provided with a variable aspect picture display ratio by the steps of generating and putting out the television picture signal in accordance with a predetermined signal format in a manner in which a selectable horizontal to vertical aspect ratio is governed by the number of horizontal scan lines used to scan picture content, and generating and putting out with the television picture signal a marker signal indicative of the aspect ratio selected. A conventional television set displays narrow aspect ratio transmissions as full screen displays and wide aspect ratio signals with top and bottom black bands, usually masked by overscan. A new television set receives the television signal and marker signal indicative of the aspect ratio selected. The new television set provides a wide aspect ratio display area and uses a marker signal extraction circuit to extract the marker signal, and a beam deflection control circuit operating under the control of the extracted marker signal to control deflection amplitudes of the picture display to generate a full height picture at a display screen of the display in accordance with the selected aspect ratio. The new television set may further include selectively positionable powered side area screening members, and a side screen control mechanism connected to the marker signal extraction circuit for selectively positioning the side area screening members relative to the display screen to cover unused side portions of the television screen in accordance with the aspect ratio selected.

18 Claims, 3 Drawing Sheets

TELEVISION SYSTEM WITH VARIABLE ASPECT PICTURE RATIO

FIELD OF THE INVENTION

The present invention relates to television picture display formats. More particularly, the present invention relates to a television system providing a variable aspect picture display ratio.

BACKGROUND OF THE INVENTION

Television picture images have two spatial dimensions, i.e. horizontal and vertical. Such images also have a time based or temporal dimension. The present discussion concerns the spatial dimensions. The aspect ratio of a television picture image is a ratio of horizontal length to vertical length, expressed in relative units. Conventional picture images have an aspect ratio of four to three, or 1.33 (when reduced). Much, but not all of, the programming material made for television follows the 1.33 aspect ratio, whether it is originated as video or cinema.

Aspect ratio is essentially an aesthetic consideration or value, i.e. what is the most pleasing rectangular shape to behold. The ancient Greek civilization developed a so-called Golden Number for rectangles in architecture. This Golden Number had an aspect ratio of about 1.62, and it is found today in the Greek ruins, such as the Parthenon in Athens. The Japanese national broadcasting service, NHK, made a study with its viewers to determine the most desirable aspect ratio for television picture viewing, incident with its development of standards for high definition television (HDTV). This study determined that 4.8 to 3 (i.e. about 1.62) was subjectively the most pleasing picture image arrangement for the human eye.

The apparent desirability of a 1.62 aspect ratio may be explained by reference to the human eye-brain mechanism and particularly by reference to the elliptical shape of the human retina. Irrespective of the precise explanation for subjective preference for a 1.62 aspect ratio for rectangles, a popular viewpoint has recently begun to surface that the conventional 1.33 television picture image aspect ratio looks too square. It looks like the aspect ratio found in old movies, and is therefore undesirably old fashioned.

With the advent of HDTV schemes have come proposals that wider aspect ratios are more aesthetically pleasing than the conventional ratio, and should be adopted. Ratios of five to three (1.66) and sixteen to nine (1.77) have frequently been proposed. Also, modern cinematographic theater movies, not made expressly for conventional television, are typically filmed with aspect ratios greater than 1.33. These theater films typically have aspect ratios which vary from about 1.65 to 2.35, the 2.35 ratio being associated with anamorphic Cinemascope (tm), or multiple film, very wide display theatrical movies.

A commonly encountered aspect ratio for modern theater movies is 1.85. These theater movies have been modified for presentation on conventional television, either by "pan and scan" techniques, or by optical compression resulting in size distortion in the resultant video picture images. The emerging preference among HDTV schemes for a 1.77 aspect ratio is said to be justified by the modern movie aspect ratio of 1.85.

In order to accomodate the increasing quantities of worthwhile programming material having disparate aspect ratios, it is very desirable for a television system to have a variable aspect ratio capability. However, this capability is not found in present television receivers following the conventional aspect ratio, and because of the great numbers of conventional sets, it is appropriate and necessary for any variable aspect ratio proposal to maintain downward compatibility with the present NTSC color signal format.

It has also been proven to be desirable to provide consumers with ACTV or HDTV receivers, which not only display a larger number of scanning lines (e.g. 1050 lines) but which are also compatible with the present NTSC color television signal format standard and are also making use of a wide display screen having, for example, an aspect ratio of 1.77.

A hitherto unsolved need has arisen for a television system which provides a selectable or variable aspect ratio, while maintaining full compatibility with the present NTSC standard. Such a television system should be capable of displaying undistorted images on conventional receiver sets having narrow aspect ratio screens (1.33), possibly with black bands appearing at the top and bottom of the picture display area in the case of wide aspect ratio picture signal transmissions, while displaying full screen, wide aspect ratio pictures on new sets using wide aspect ratio display screens without black bands at the top or bottom of the picture.

SUMMARY OF THE INVENTION WITH OBJECTS

A general object of the present invention is to provide a television system with the capability of a variable aspect ratio on new television sets equipped with a wide display screen, while maintaining full compatibility with conventional television receiver sets, so as to overcome present limitations and drawbacks of the prior art.

A more specific object of the present invention is to automatically modify by an equal amount the horizontal and vertical deflection voltage amplitudes of new wide screen television receivers in order to display images having different aspect ratios without blank areas at either the top or the bottom of the picture.

A further specific object of the present invention is to display on conventional, narrow screen television sets a transmitted wide aspect ratio television signal without geometrical distortions and with black bands at the top and bottom of the picture, apparent only in inverse relation to customary overscan (10%) of such conventional sets.

In accordance with the present invention, a television signal is provided with a variable aspect picture display ratio by the steps of generating and putting out the television picture signal in accordance with a predetermined signal format in a manner in which a selectable horizontal to vertical aspect ratio is governed by the number of horizontal scan lines used to scan picture content, and generating and putting out with the television picture signal a marker signal indicative of the aspect ratio selected.

In one aspect of the present invention further steps include separating the television signal and the marker signal at a new wide screen television receiver, and using the marker signal to adjust horizontal and vertical beam sweep deflection amplitudes of a cathode ray tube or other display device of the new receiver in accordance with the aspect ratio selected, so that the resultant picture display occupies a full display height irrespective of horizontal aspect.

In a further aspect of the present invention further steps include providing the new wide screen television receiver with selectively positionable powered side area screening members, and using the marker signal to selectively position the side area screening members in order to cover unused side portions of the television screen in accordance with the aspect ratio selected.

In one more aspect of the present invention the screening members comprises moveable side screens operable by a motor, and the marker signal is used to control movement of the side screens toward and away from each other by operation of the motor in accordance with the selected aspect ratio.

In a still further aspect of the present invention the selectable aspect ratio includes a plurality of discrete aspect ratios, such as approximately 1.33, 1.62 and 1.77.

A television set incorporates the principles of the present invention and includes a wide screen display. The set is adapted to receive a television signal having a variable aspect picture display ratio created by generating and putting out the television picture signal in accordance with a predetermined signal format in a manner in which a selectable horizontal to vertical aspect ratio is governed by the number of horizontal scan lines used to scan picture content. The television picture signal also carries a marker signal indicative of the aspect ratio selected. The new television set includes a marker signal extraction circuit for extracting the marker signal, and a beam deflection control circuit operating under the control of the marker signal extraction circuit for controlling electron beam deflection amplitudes of the cathode ray tube to generate a full height picture at a display screen of the tube in accordance with the selected aspect ratio. In all cases the ratio of horizontal and vertical deflection voltage amplitudes remains constant, in order to avoid geometrical distortions in the resultant picture image being displayed.

In one more aspect of the invention, the new wide display television set further comprises selectively positionable powered side area screening members, and a side screen control mechanism connected to the marker signal extraction circuit for selectively positioning the side area screening means relative to the display screen to cover unused side portions of the television screen in accordance with the aspect ratio selected.

In a still further aspect of the invention, the television set side area screening members comprise moveable side screens operable by a motor, and the side screen control mechanism controls the motor to move the side screens toward and away from each other in accordance with the selected aspect ratio. The side screen control mechanism may be responsive to a signal indicating that the television set has been turned off so as to move the side screens to a position fully enclosing and covering the television display screen.

These and other objects, aspects, advantages and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

In accordance with the principles of the present invention, television program material is transmitted in a selectable one of a plurality of available picture aspect ratios. For conventional television programming material and for old movies, the selected aspect ratio is 1.33. For modern theater movies, the aspect ratio is e.g. 1.62. For wide screen subject matter, such as Cinemascope (tm) movies, a wider aspect ratio of e.g. 1.77 is used.

As the aspect ratio increases, the number of active scanning lines given to the cinematographic subject matter becomes reduced. For example, in the NTSC signal format standard, 483 scan lines are utilized to realize a conventional (1.33) aspect ratio. Only 397 lines are actively used for an aspect ratio of 1.62; and, 362 lines are actively used for an aspect ratio of 1.77. These numbers respectively become 966 lines for 1.33, 794 lines for 1.62 and 724 lines for 1.77 when line doubling techniques are employed by a new wide display receiver. An active scan line is one which contains and conveys video picture or image information, as opposed to merely to synchronizing, timing or test information.

Figure 1:
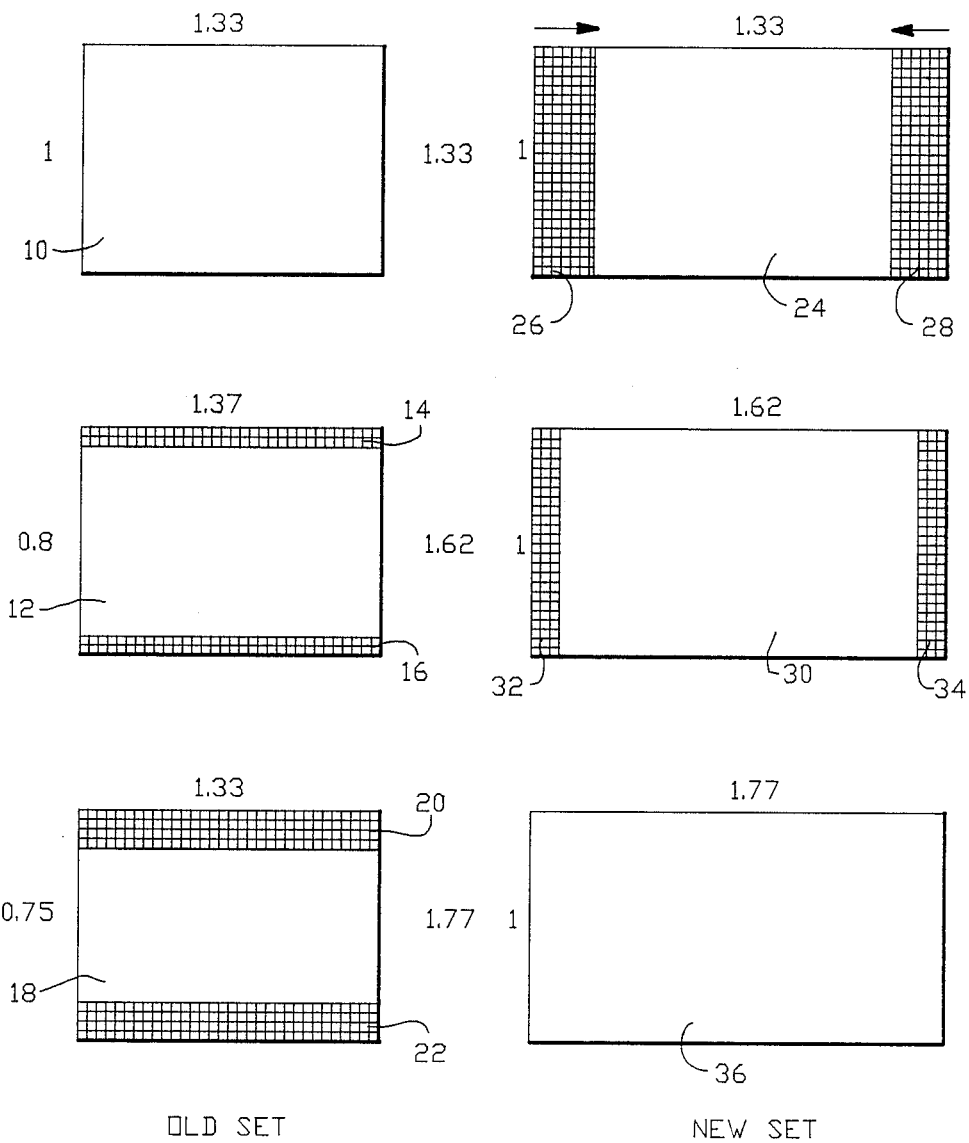
FIG. 1 is a set of graphs of television displays at a plurality of aspect ratios for conventional receivers and for new receivers.

With reference to FIG. 1, a conventional picture display area 10 illustrates a conventionally provided four unit horizontal dimension to three unit vertical dimension ratio or 1.33. With this aspect ratio in the NTSC format, all of the scan lines usually devoted to television picture image information are employed in conveying the picture to the receiver.

When the aspect ratio is increased to 1.62 for a conventional television set, as shown at a screen display area 12, narrow black bands 14 and 16 (in NTSC color format) appear respectively at the top and bottom of the picture 12. In this expanded aspect ratio, shown by the picture area 12, approximately 10 percent of the scanning lines are not used for active picture content and are actually transmitted as the upper and lower black horizontal bands 14 and 16. With most conventional television sets which are overscanned by 10 percent, the black bands 14 and 16 are barely visible, if visible at all.

A yet wider aspect ratio of 1.77 is illustrated on a conventional television display picture area 18 in FIG. 1. Therein, top and bottom black bands 20 and 22 have increased in dimension from the bands 14 and 16 associated with the 1.62 aspect ratio. The black bands 20 and 22 represent unused scan lines of sufficient number as now to be clearly visible on the conventional television set display 18, irrespective of conventional overscan. However, by making the bands 20 and 22 black in NTSC color format, an aesthetically unobjectionable top and bottom border is achieved, and with conventional television receiver set design may be perceived to be part of, or a continuation or extension of, the tube mask and cabinet surrounding the display surface.

New television receiver sets which double the scan lines sent in existing NTSC-format color broadcasts or recordings provide e.g. 1050 scan lines from e.g. 525 original lines. Scan line doubling techniques are discussed in the applicant's copending U.S. patent application Ser. No. 07/262-321 filed on Oct. 25, 1988, entitled "Improved Film-to-Video Converter With Scan Line Doubling", the disclosure of which is incorporated herein by reference.

Figure 3:
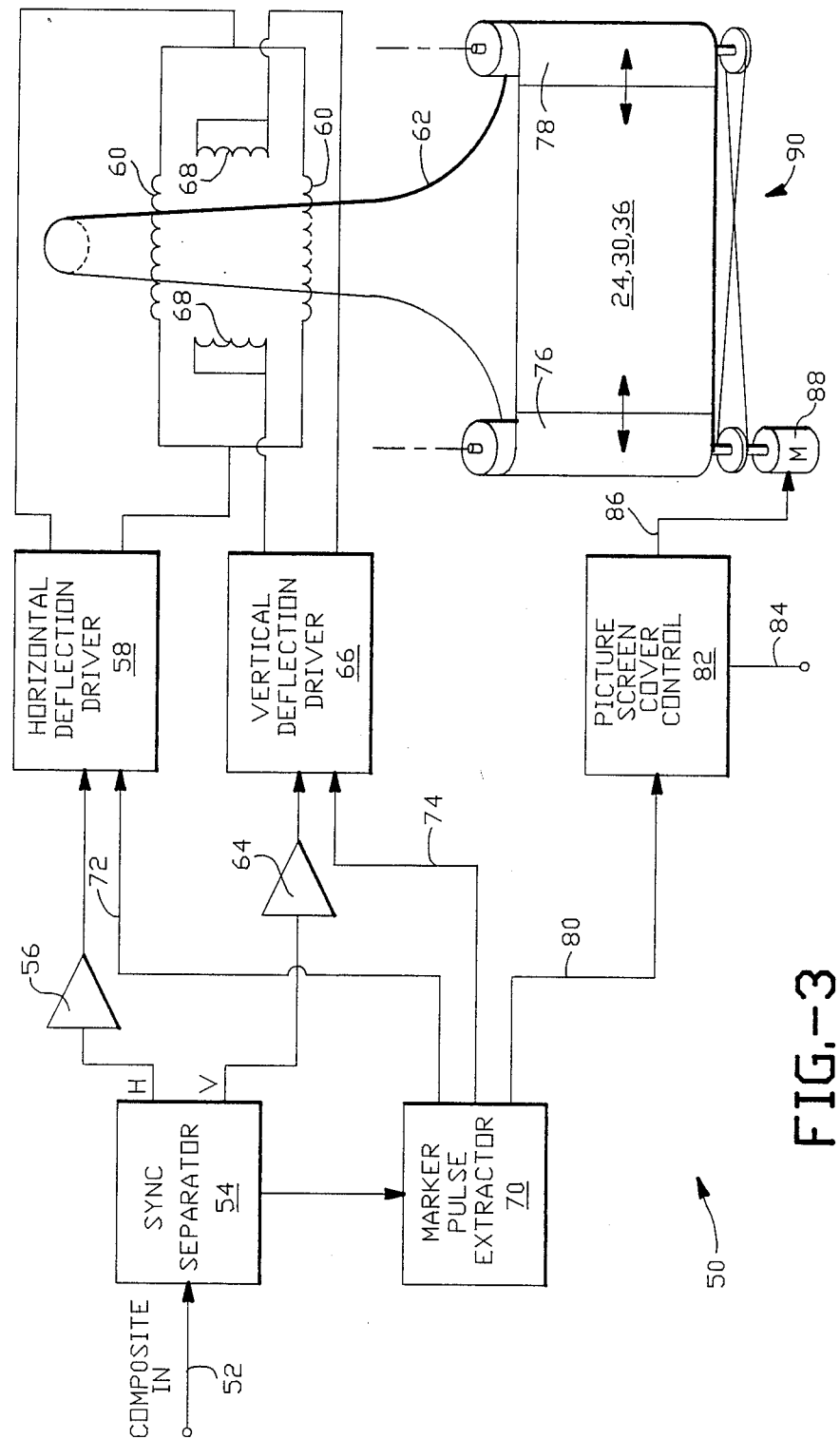
FIG. 3 is a block diagram of portions of a new television receiver providing variable aspect ratios in accordance with the principles of the present invention.

Variable beam deflection control techniques may be employed with new receivers to provide full height picture screen displays for signals having variable aspect ratios. The three ratios shown for the conventional picture area in FIG. 1 are also shown for a new television receiver 50 (FIG. 3). For a conventional aspect ratio of 1.33, the new television picture image 24 provides a full height picture area with a truncated width having wide vertical black (unscanned) stripes 26 and 28 on the left and right sides of the active picture display area.

For an aspect ratio of 1.62, the active picture area 30 is accompanied by narrower left and right vertical stripes 32 and 34. And, for an aspect ratio of 1.77 there are no stripes whatsoever in the picture display area 36.

Figure 2:
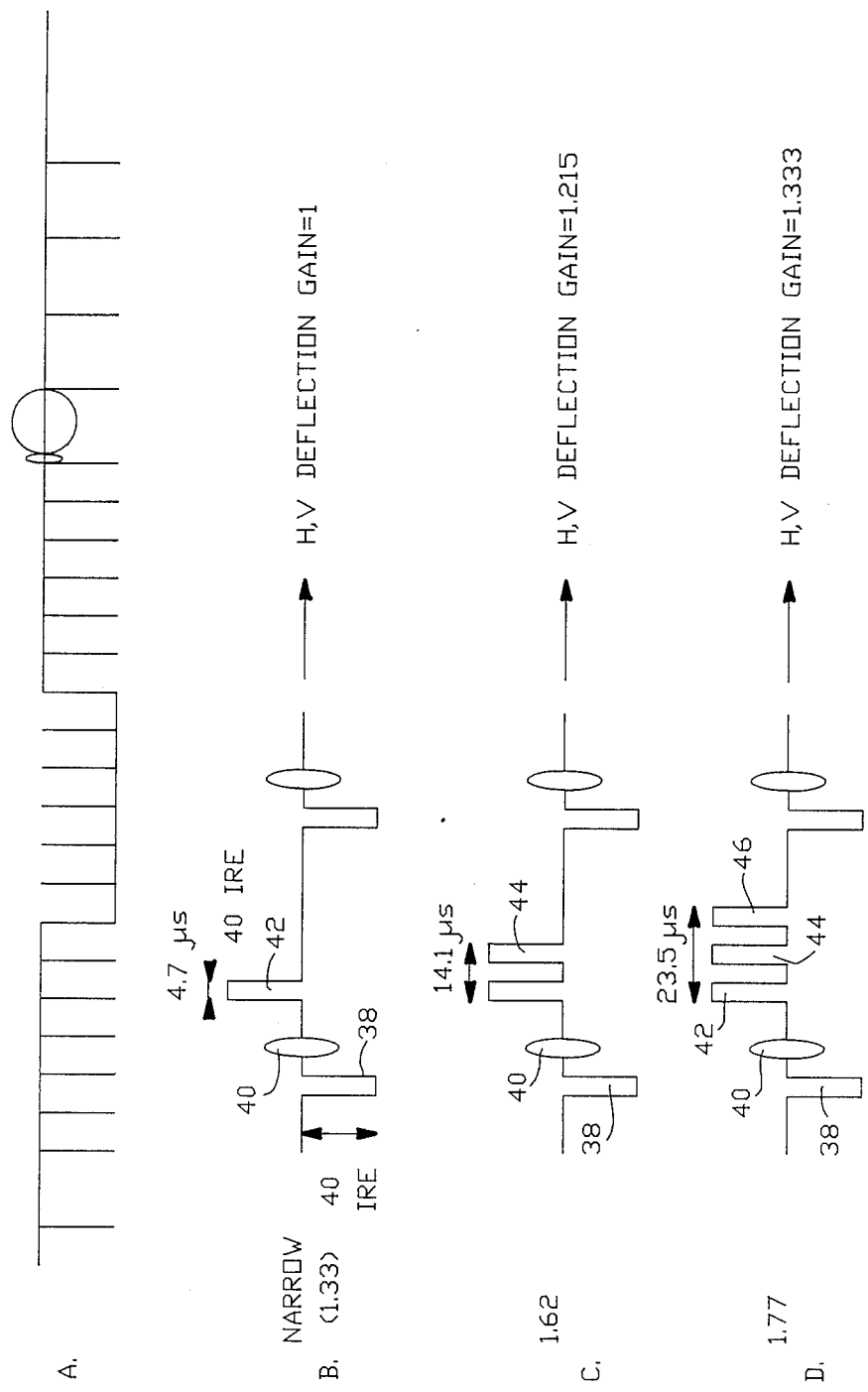
FIG. 2 is a set of graphs of television waveforms illustrating inclusion of aspect ratio identification pulses within the vertical interval.

In order for the new television receiver set 50 to adapt to the particular aspect ratio being sent, it is necessary to inform the set 50 of the ratio. One presently preferred method is to provide additional information within the vertical synchronizing pulse interval. FIG. 2 sets forth in graph A a conventional vertical synchronizing pulse interval in the NTSC signal format. The circle identifies the location of a scan line within the interval which may include a signal indicative of aspect ratio.

Graph B of FIG. 2 is a greatly enlarged portion of the Graph A waveform at the area circled in graph A. The signal of interest includes a horizontal synchronizing pulse 38, a color burst signal 40 at the color subcarrier frequency of 3.579545 MHz, and a white-level-going pulse 42 following after the color burst 40 by a predetermined amount. This pulse will cause the new receiver 50 (FIG. 3) to employ relative horizontal and vertical deflection gains of unity, and will result in the picture 24 depicted in FIG. 1.

The pulse 42 has a predetermined duration, such as 4.7 microseconds, and it may be provided and used to indicate a conventional 1.33 aspect ratio. It is desired that some pulse be sent for each aspect ratio in order to provide the system with immunity to noise.

In the case of a 1.62 aspect ratio, graph C of FIG. 2, two pulses 42 and 44 are sent, and the overall pulse train duration is e.g. 14.1 microseconds. In this case, the new television receiver 50 (FIG. 3) will operate with horizontal and vertical deflection gains of 1.215 in order to provide the picture 30 depicted in FIG. 1. In this picture, the new set 50 increases its scan deflections so that the black bars 14 and 16, otherwise seen in the conventional picture 12 are above and below the active display area.

In the case of a 1.77 aspect ratio, graph D of FIG. 2, three identification pulses 42, 44 and 46 are sent, and the overall pulse train duration is e.g. 28.5 microseconds. In this case the new television receiver 50 will operate with horizontal and vertical deflection gains of 1.333 in order to provide the full surface wide angle picture 36 depicted in FIG. 1.

FIG. 3 illustrates relevant portions of the new television receiver set 50. A composite NTSC format signal input 52 leads to a sync separator circuit 54 which separates the horizontal (H) and vertical (V) synchronizing pulses from the composite in conventional fashion.

The H synchronizing pulses are amplified in an amplifier 56 and delivered to synchronize and control operation of a horizontal oscillator/driver 58 in conventional fashion. The driver 58 generates horizontal deflection currents which are applied to horizontal deflection coils 60 located adjacent to a cathode ray tube 62 providing the picture displays 24, 30 and 36 as graphed in FIG. 1.

The V synchronizing pulses are amplified in an amplifier 64 and delivered to synchronize and control operation of a vertical oscillator/driver 66 in conventional fashion. The driver 66 generates vertical deflection currents which are applied to vertical deflection coils 68 also located adjacent to the tube 62.

A marker pulse extractor circuit 70 may be coupled to the sync separator circuit 54, and the circuit 70 extracts the marker pulses 42, 44 and 46 from the incoming NTSC composite signal. The circuit 70 generates a horizontal deflection control signal and puts it out on a line 72 to control output deflection amplitude of the horizontal deflection driver 58. Output deflection amplitude is adjusted to be related to either the number of pulses 42, 44, 46 present during the vertical interval, or to be related to the overall time duration associated with the pulse train (FIG. 2). The circuit 70 also generates a vertical deflection control signal related to pulse number or duration and puts it out on a line 74 to control output deflection amplitude of the vertical deflection driver 66.

In accordance with one aspect of the present invention, the new television receiver set 50 is provided with a moveable closure, such as side side screens 76 and 78. These side screens 76 and 78 are moveable relative to the picture display area of the picture tube 62 in order to mask off the unscanned areas thereof associated with the displays 24 and 30. The screens 76 and 78 may also extend to cover the picture tube 62 completely, when the new set 50 is turned off.

The marker pulse generator 70 generates a side screen control signal and puts it out over a line 80 to a side screen control circuit 82. This circuit 82 may also receive a signal over a line 84 indicating that the televison set 50 is being turned off. The control circuit 84 generates a bidirectional driving signal and puts it out over a line 86 to an electromechanical prime mover 88, such as a motor. The motor 88 is coupled via a mechanical coupling arrangement 90 to operate the side screens 76 and 78.

While side screens 76 and 78 have been shown by way of example, many other forms of controllable masks, such as panels, louvers, shutters etc., may be employed and operated e.g. by solenoids, etc. in order to frame the active picture area 24, 30 or 36 in relation to the aspect ratio actually being received.

While the method and apparatus of the present invention have been summarized and explained by an illustrative application in a television system having a variable aspect picture display ratio, it will be readily apparent to those skilled in the art that many widely varying embodiments and applications are within the teachings and scope of the present invention, and the examples presented herein are by way of illustration only and should not be construed as limiting the scope of this invention.

I claim:

1. A method for operating an improved television display device for displaying a television signal following a predetermined signal format and having within that format a variably preselectable aspect ratio, the method comprising the steps of:

generating and putting out a television picture signal in accordance with the predetermined signal format which includes a predetermined constant number of horizontal scanning lines per vertical scanning period and in which the aspect ratio is preselected by selecting the number of horizontal scanning lines used for scanning active visual image picture content, and displaying on a screen of the improved television display device a picture image of the television picture signal without visible parallel edge bands at opposite top and bottom areas of the display by detecting the preselected aspect ratio of the television picture signal and by adjusting in equal amounts the amplitudes of horizontal and vertical deflection waveforms generated within the display device thereby to magnify or shrink the picture image in accordance with the detected preselected aspect ratio.

2. The method set forth in claim 1 comprising the further steps of:

providing the television display device with selectively positionable powered side area screening means, selectively positioning the side area screening means to cover otherwise visible, blank side portions of the screen in accordance with the aspect ratio selected.

3. The method set forth in claim 2 wherein the screening means comprises moveable side screens operable by a motor, and wherein the step of using the marker signal comprises the steps of moving the side screens toward and away from each other by operating the motor in accordance with the detected aspect ratio.

4. The method set forth in claim 1 wherein the variable aspect ratio is selected as one of a plurality of discrete aspect ratios within the predetermined signal format.

5. The method set forth in claim 4 wherein the discrete aspect ratios are approximately 1.33, 1.62 and 1.77.

6. The method set forth in claim 1 wherein the generating step further comprises the step of generating and putting out a marker signal within the television picture signal which indicates the preselected aspect ratio of the picture image thereof.

7. The method set forth in claim 6, comprising the further steps of:

separating the television picture signal and the marker signal at the television display device, using the marker signal to modify in the same proportions the horizontal and vertical deflection amplitudes of the picture display device in accordance with the aspect ratio selected.

8. The method set forth in claim 1 wherein the single predetermined signal format comprises NTSC.

9. The method set forth in claim 1 wherein the single predetermined signal format comprises PAL.

10. A television set including a picture image display and adapted to receive a television signal generated in accordance with a predetermined signal format which includes a constant number of horizontal scanning lines per vertical scanning period and in which a variable aspect ratio is determined by the number of active horizontal scanning lines used for scanning an active picture image of the television signal, the television set including:

aspect ratio detection means for detecting the aspect ratio of the picture image of the television signal, deflection control means operating under the control of the aspect ratio detection means for modifying in equal amounts horizontal and vertical deflection amplitudes of the television set in order to magnify or shrink display of the picture image on a screen of the display in accordance with the detected aspect ratio, the deflection control means operating to provide a display of the picture image that fully occupies the screen height.

11. The television set as defined by claim 6 further comprising selectively positionable powered side area screening means, and side screen control means connectted to the aspect ratio detection means for selectively positioning the side area screening means relative to the display screen to cover otherwise visible, blank side portions of the display screen in accordance with the aspect ratio detected by the aspect ratio detection means.

12. The television set as defined in claim 11 wherein the side area screening means comprises moveable side screens operable by a motor, and wherein the side screen control means controls the motor to move the side screens toward and away from each other in accordance with the selected aspect ratio.

13. The television set as defined by claim 12 wherein the side screen control means is responsive to a signal indicating that the television set has been turned off so as to move the side screens to a position fully enclosing and covering the television display screen.

14. The television set as defined by claim 12 wherein the picture display comprises a cathode ray tube having an electroluminescent display screen.

15. The television set as defined by claim 12 wherein the picture display screen includes a projection lens for focusing the picture image upon the screen.

16. The television set as defined by claim 6 wherein the television signal includes a marker signal indicative of the aspect ratio of the picture image of the television signal, and wherein the aspect ratio detection means detects the marker signal and derives therefrom the aspect ratio of the picture image.

17. The television set as defined by claim 6 wherein the predetermined signal format comprises NTSC.

18. The television set as defined by claim 6 wherein the predetermined signal format comprises PAL.

* * * * *